United States Patent [19]

Alden et al.

[11] Patent Number: 4,460,822

[45] Date of Patent: Jul. 17, 1984

[54] PRESSURELESS STEAM COOKER

[75] Inventors: Lorne B. Alden, Crystal Lake, Ill.; Theodore A. Richardson, Revere, Mass.

[73] Assignee: Market Forge, Div. of Beatrice Foods Co., Everett, Mass.

[21] Appl. No.: 344,818

[22] Filed: Feb. 1, 1982

[51] Int. Cl.³ .................. A21B 1/36; F27D 7/02; F22B 1/28

[52] U.S. Cl. .................. 219/401; 219/276; 126/20; 126/369

[58] Field of Search ............ 219/400, 401, 271, 272, 219/273, 275, 276; 126/20, 20.1, 20.2, 369, 369.1, 369.2, 369.3; 422/11, 26

[56] References Cited

U.S. PATENT DOCUMENTS

| 1,943,575 | 1/1934 | Abendroth | 219/400 |
| 2,201,389 | 5/1940 | De Give | 219/401 |
| 2,494,022 | 1/1950 | Weintrob | 219/401 |
| 2,715,898 | 8/1955 | Michaelis | 219/401 |
| 2,766,366 | 10/1956 | Eckhoff | 219/273 |
| 2,791,199 | 5/1957 | Hamnett | 219/400 |
| 3,191,518 | 6/1965 | Paveka | 219/401 |
| 3,424,231 | 1/1969 | Truhan | 219/401 |

FOREIGN PATENT DOCUMENTS

| 550920 | 2/1943 | United Kingdom | 219/400 |
| 1476119 | 6/1977 | United Kingdom | 219/400 |

Primary Examiner—C. L. Albritton
Assistant Examiner—Teresa J. Walberg
Attorney, Agent, or Firm—Robert T. Gammons

[57] ABSTRACT

A steam cooker comprising a heating chamber and integral steam-generating chamber in open communication with the heating chamber such that steam generated in the steam-generating chamber flows freely from the steam-generating chamber into the heating chamber, a cooking chamber supported in the heating chamber in a position to be exposed throughout the major portion of its entire surface to the steam in the heating chamber and orifices in certain of the exposed surfaces of the cooking chamber through which steam is admitted to the cooking chamber.

7 Claims, 9 Drawing Figures

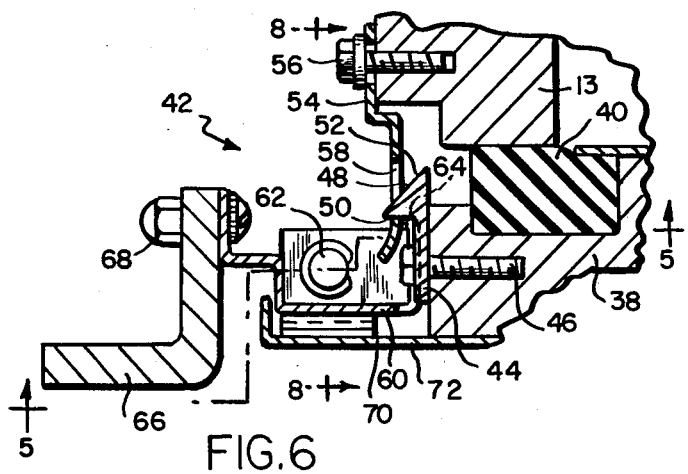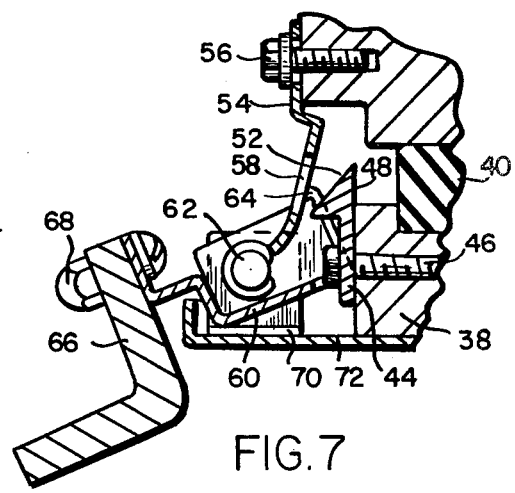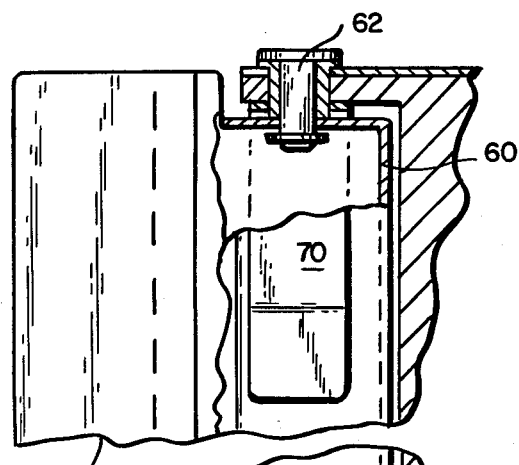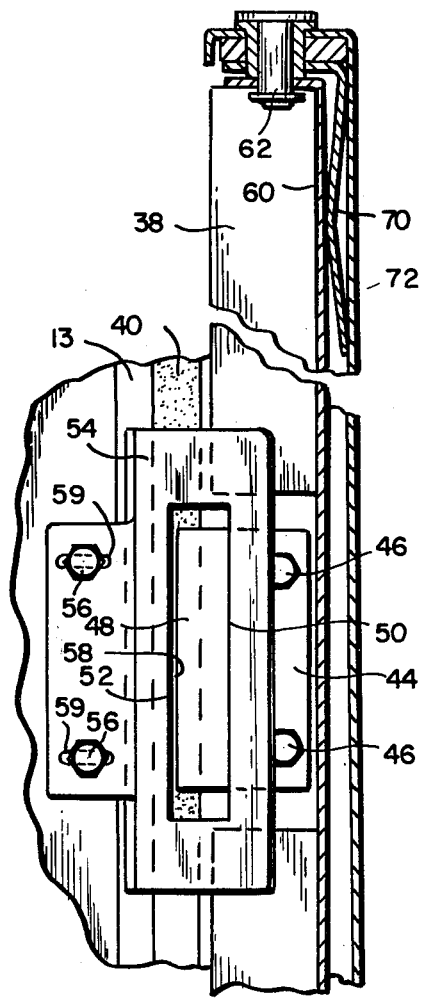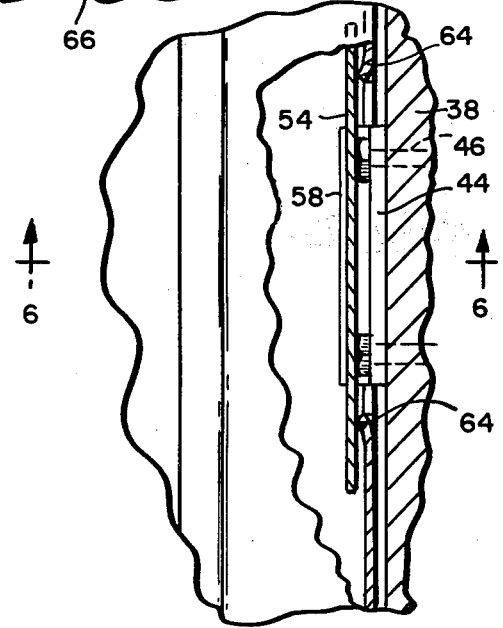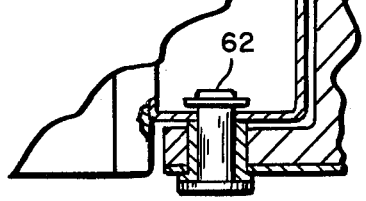

PRESSURELESS STEAM COOKER

BACKGROUND OF INVENTION

Conventional steam cooking units employ separate and distinct boilers or steam generators requiring piping for transmitting the steam to the cooking compartment. This entails structural complications, inefficiency through the loss of heat by conduction and radiation and lack of precise control of the heating periods. It is the purpose of this invention to provide an integrated steam cooking unit to thus avoid the problems incident to prior apparatus, to wit, heat losses due to conduction and radiation and to gain the advantages of efficient use of the power required for operation and the close control desired to achieve the most attractive product. Further objects are to provide apparatus structured to effect efficient use of steam by direct transfer of the steam from the heating chamber to the cooking chamber with safety cutoff when the door is opened for removal of the finished product or cleanout to avoid loss of steam and preheating to minimize condensation.

SUMMARY OF INVENTION

As herein illustrated, the steam cooker comprises a heating chamber and an integral steam generating chamber in open communication with the heating chamber such that steam generated in the steam generating chamber flows freely from the steam generating chamber into the heating chamber, a cooking chamber supported in the heating chamber in a position to be exposed throughout the major portion of its entire surface to the steam in the heating chamber and orifices in certain of the exposed surfaces of the cooking chamber through which steam is admitted to the cooking chamber. The cooking chamber is sufficiently smaller in overall dimensions than the interior of the heating chamber so as to provide a space encompassing the major portions of the cooking chamber so that the heating chamber provides a steam jacket about the cooking chamber. The walls of the heating chamber are externally insulated. Interiorly of the cooking chamber there are supports for supporting items to be cooked and, desirably, the supports are so located that the orifices through which the steam is introduced to the cooking chamber enter the cooking chamber between supports. The steam generating chamber is located at the bottom of the heating chamber and there are heating elements supported therein for generating steam within the steam generating chamber and a float control valve for supplying water to the heating chamber with a cutoff for low water. The cooking chamber is provided with a door hinged at one side and with latch means at the opposite side, the latter comprising a latch member and a latch plate, the latch plate being fixed to the chassis of the cooking chamber and the latch plate being attached to the door. The latch plate is flexible and is adapted to be displaced by the latch member when the door is moved toward a closed position and thereafter become fully engaged with the latch plate when the door is closed. There is means for disengaging the latch plate and latch member comprising a pivotally-supported rocker which, when pivoted, will spring the latch plate away from the latch member so as to release the door and a handle fixed to the rocker for effecting pivotal movement. There is spring means which biases the rocker to an inoperative position.

The invention will now be described with reference to the accompanying drawings, wherein:

FIG. 1 diagrammatically illustrates the steam cooker which comprises the substance of the invention;

FIG. 5 is an enlarged fragmentary elevation at the left-hand side of FIG. 3 showing the latch for the door partly in elevation and partly in section;

FIG. 6 is a section taken on the line 6—6 of FIG. 5 showing the latch engaged;

FIG. 7 is a section corresponding to FIG. 6 showing the latch disengaged;

FIG. 8 is a section taken on the line 8—8 of FIG. 6; and

Figure 2:
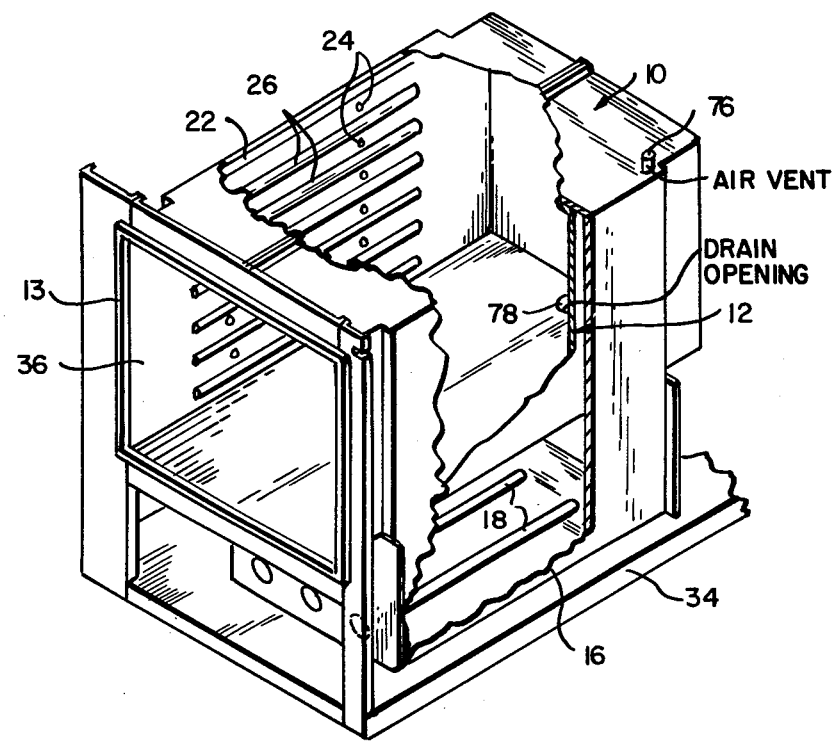
FIG. 2 is an isometric of the steam cooker embodying the invention diagrammatically illustrated in FIG. 1 with portions of the supporting chassis broken away.

One of the purposes of the present invention is to provide a steam cooker of the kind wherein the steam heats the cooking compartment externally and enters the cooking compartment to cook the food placed within the cooking compartment. This is achieved, as diagrammatically illustrated in FIG. 1, by providing a heating chamber 10 within which there is supported a cooking chamber 12 with a space 14 between the heating chamber and the cooking chamber along the sides and ends and at the bottom into which steam can be delivered at approximately "0" psi or a very low pressure from a steam generating chamber 16 which comprises an integral part of the heating chamber 10 and is located at the bottom side thereof in open communication with the space 14. There are heating elements 18 supported in the steam generating chamber 16 for heating water 20 supplied to the steam generating chamber to provide steam which, rising from the steam generating chamber, fills the space 14 about the bottom and side walls. Two of the opposite side walls 22-22 contain vertically-spaced, parallel rows of openings within which there are fixed jet heads 24 through which the steam has access to the interior of the cooking chamber 12. There are on these same walls 22-22 vertically-spaced, parallel track members 26-26 spaced above and below the jet heads 24 for receiving trays 28 by means of which food may be supported in the cooking chamber for exposure to the steam and cooking thereby. The exterior of the heating chamber 10 and the integrally-formed heat generating chamber 16 are insulated by means of insulating material 30 applied to these walls and supported in a sheet metal chassis 32 which, in turn, accommodates the accessories required for its functional operation.

Figure 1:
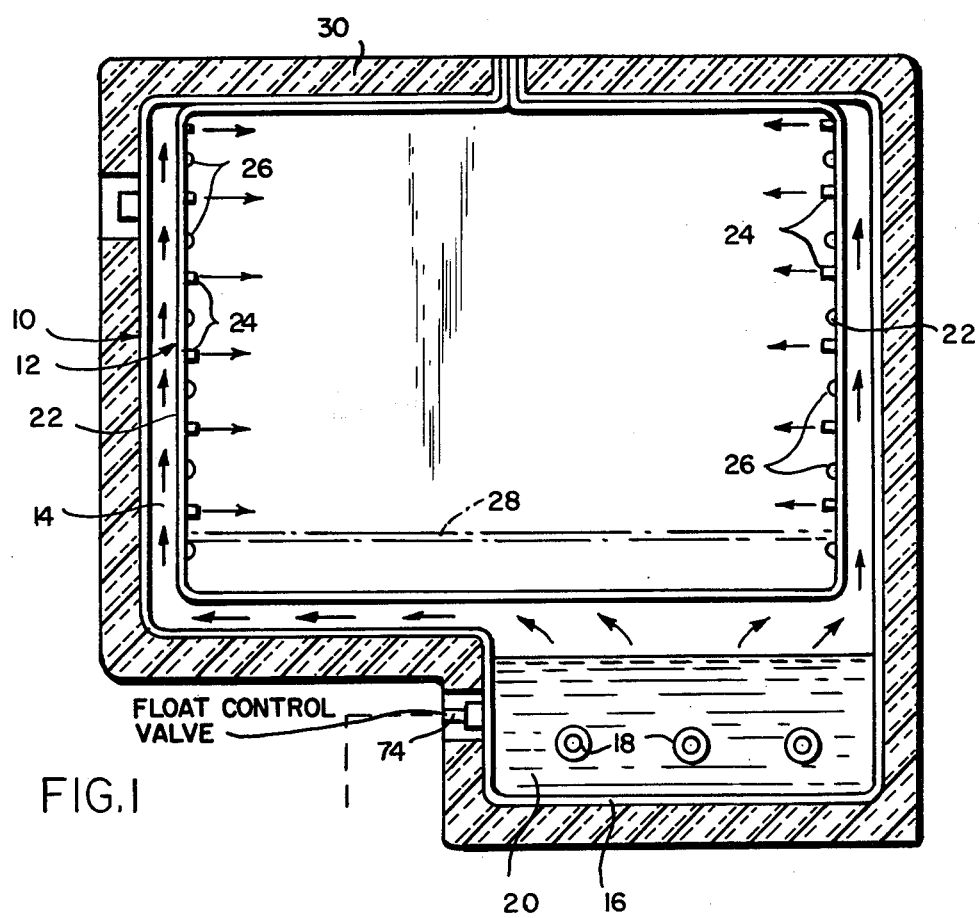
Figure 3:
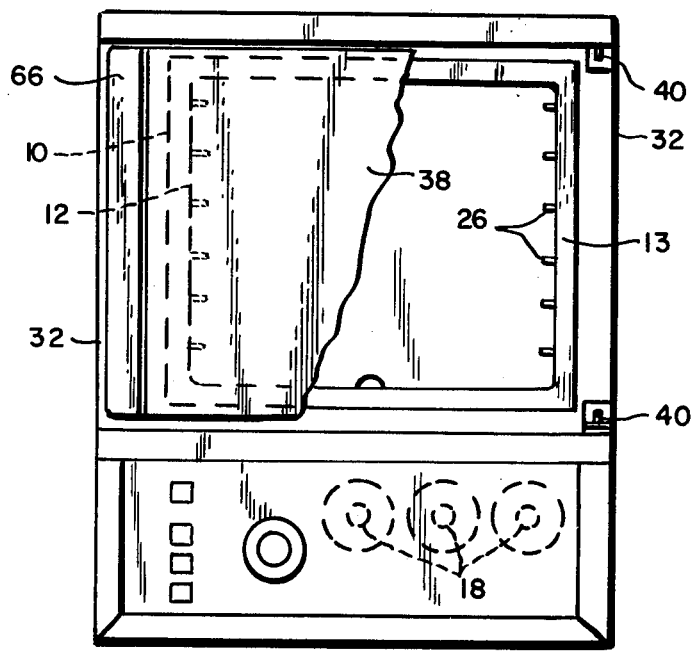
FIG. 3 is a front elevation of the steam cooker shown in FIG. 2 with the door at the front partially broken away.
Figure 4:
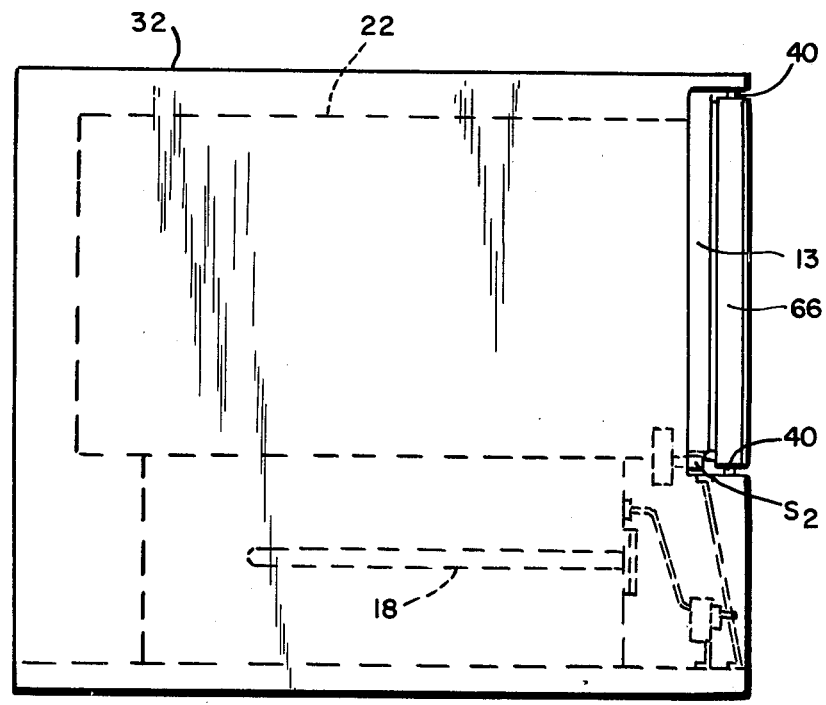
FIG. 4 is a side elevation of the steam cooker shown in FIG. 2 taken from the left-hand side.

The structure shown in FIG. 1 in vertical section is shown in perspective in FIG. 2 mounted on a flat base plate 34 which forms the bottom part of the chassis 32 which is of rectangular, horizontal and vertical section, as shown in FIGS. 3 and 4.

There is an opening 36 at one end of the cooking chamber 12 to provide access to the interior of the cooking chamber. The opening is bounded by a rigid frame 13 and a door 38 is hinged to the vertical face of the chassis at one side of the frame on hinge pins 40-40 for swinging movement about a vertical axis. The door 38, fragmentary portions of which are shown in FIGS.

5, 6, 7 and 8, is provided with a peripheral gasket 40 which abuts the frame 13 about the opening 36 and thus provides, when the door is latched shut, a seal.

There is a latching structure 42 at the side of the door opposite the hinged side for holding the door firmly closed during cooking, designed on the one hand to permit the door to be swung into locking position by merely slamming the door, that is, without manipulation and on the other hand to provide for easy manual release of the door when desired. The latching structure is specifically shown in FIGS. 5 to 8 and comprises, in part, a latch 44 fastened by bolts 46 to the distal side of the door 38. The latch 44 has a triangular-shaped edge 48 which provides a locking face 50 and a cam face 52. A flexible latch 54 is fastened by bolts 56 to the side of the frame 13 adjacent the latch. The latch plate contains a vertical slot 58 for receiving the edge 48 as shown in FIG. 6 with the wedge extending through the slot 58. The latch and latch plate are located approximately midway between the top and bottom sides of the door and the latch plate is provided with spaced, parallel, horizontal slots 59-59, by means of which it can be adjusted horizontally relative to the latch edge 48.

The latch plate 54 is flexible and, as shown in FIG. 6, the edge 48 normally extends through the slot 58 so that the locking face 50, by engagement with the edge of the slot, prevents the door from being opened. To enable opening the door, there is provided a rocker member 60 which is pivotally supported at its upper and lower ends on pins 62-62 for rotation about a vertical axis. The rocker member 60 carries an actuator 64 which is located between the latch and latch plate, as shown in FIG. 6, which can be rotated by rotating the rotator 60, as shown in FIG. 7, to disengage the latch from the latch plate. A handle 66 fastened by bolts 68 to the rocker provides for manually rotating the rotor. A spring 70 provides for restoring the rotor to its inoperative position when the handle is released. The spring 70, as shown in FIG. 8, is positioned between the rotor and a face panel 72 of the door, a portion of which extends across the latch structure.

The latch 48, as previously described, is provided with a cam surface 52 which operates when the door is swung toward a closed position to first deflect the latch plate away sufficiently to allow the edge to be moved inwardly of the slot 58 and thereafter to allow the latch plate to return to a position of engagement with the locking face of the latch.

The structure described is relatively simple, but is very effective in not only providing a good seal about the open end of the cooking chamber, but also a device which enables easily opening the door and, in particular, closing the door without requiring manipulation.

Figure 9:
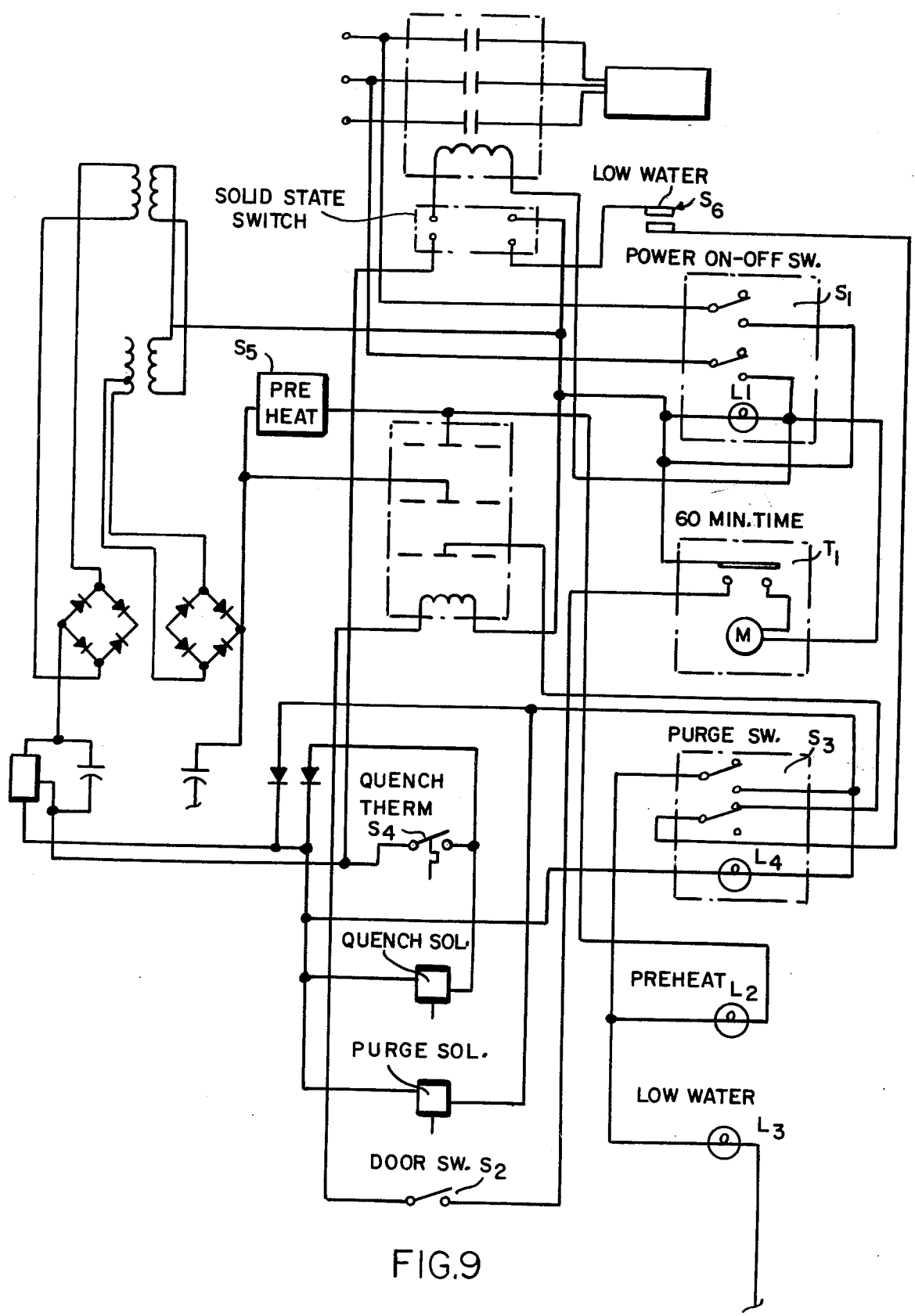
FIG. 9 is a diagram of the control circuit.

As has been previously explained, at no pressure or very low pressure, steam is generated in the steam generating chamber 16 with electric heating elements 18 positioned in the steam generating chamber so as to be submerged in water supplied to the steam generating chamber through a float controlled valve 74 which provides for low water cutoff. There is an air vent 76 at the top of the heating chamber 10 provided with a safety release valve "V" and a drain opening 78 at the bottom of the cooking chamber 12 for returning condensate to the steam generating chamber 16. The circuitry for controlling operation of the cooker is shown in FIG. 9 and is designed to conserve both water and power by introducing steam into the cooking compartment only during the cooking cycle. The door may be opened at any time during the cooking cycle; however, a safety interlock switch is proved to stop the flow of steam into the cooking chamber when the door is open, thereby eliminating steam waste. The control is located in the lower part of the chassis and includes, as shown in the circuit diagram, a power ON/OFF Switch S1 and door switch S2, a timer T1, a purge switch S3 and a quench switch S4. The circuit also contains heating elements 18, three in number, only one of which is shown, a preheat switch S5, a lower water switch S6 and indicators L1, L2, L3 and L4 which, respectively, indicate that the power is on, that the cooker is in the preheat phase of its operation, that the water in the steam generating chamber is at the required level and that the cooker is in the purge stage of operation.

Operation of the cooker is initiated by turning on the ON/OFF switch S1 and, provided the water in the steam generating chamber is at the proper level, the door closed and the preheat switch S1 closed, power will be supplied to the heating elements. As the water in the steam generating chamber is heated up and begins to produce steam, steam rises into the space between the heating chamber and the cooking chamber and condenses on the relatively cold walls of the heating chamber and cooking chamber within the space between the two. The condensate flows down the walls and is returned to the steam generating chamber through the opening at the bottom of the heating chamber which is in open communication with the steam generating chamber. This continues until the temperature of the walls of the heating chamber and cooking chamber reach approximately 190 degrees F. (88 degrees C.), whereupon the preheating switch opens and the steam generation is stopped by interrupting the supply of power to the heating elements. At this point, uncooked food can be placed in the cooking compartment and cooking is commenced by setting the timer "T" for the desired cooking period. Cooking will proceed without substantial condensation and, hence, with close control of cooking conditions. This mode of preheating conserves water and power by introducing steam into the cooking compartment only during a cooking cycle. The door switch provides for stopping the steam flow anytime the door is opened to inspect the food therein or to permit food to be removed by shutting off the power to the heating elements until the door is again closed.

As related above, there is a low water cutoff which automatically shuts off power should the water fall below a predetermined level, for example, if the flow control inlet valve were to malfunction.

The quench valve has for its purpose to supply cold water to the drain pipe to cool the steam condensate water therein to a predetermined low temperature level before it is drained. This is required by regulation which prohibits draining water higher than a predetermined temperature level into the waste system.

The purge valve has for its purpose to permit draining the quenching water from the steam generating chamber at the end of a cooking period or the end of the day so as to start with fresh water for the next operation.

The steam orifice outlets or jet heads can be varied in diameter to obtain optimum steam dispersion at various boiler heat inputs.

As thus described, the steam cooker of this invention constitutes an advance in the art in that it provides for a relatively simple, trouble-free piece of equipment, which makes efficient use of power and water, which minimizes radiation and conduction losses, which minimizes condensation, which affords optimum operating conditions and which provides closely-controlled cooking conditions and highly satisfactory end results.

It should be understood that the present disclosure is for the purpose of illustration only and includes all modifications or improvements which fall within the scope of the appended claims.

What is claimed is:

1. A cooker comprising, in combination, a heating chamber, a steam-generating chamber and a cooking chamber, said steam-generating chamber comprising an integral part of the heating chamber at the bottom thereof which opens into the heating chamber, said cooking chamber being of smaller horizontal cross section and smaller vertical section than the heating chamber and supported therein against the top of the heating chamber and centered with respect to the sides such that there is a continuous, open manifold space surrounding the sides and coextensive with the bottom of the cooking chamber which is in direct communication with the steam-generating chamber for receiving steam generated in the steam-generating chamber by convection, said cooking chamber having inperforate top and bottom walls and, in two opposite side walls, vertically-spaced lines of longitudinally-spaced apertures to provide communication between the manifold space and the interior of the cooking chamber, vertically-spaced tray supports on said side walls of the cooking chamber for supporting food-supporting trays, food-supporting trays supported by said tray supports between the lines of apertures, said food-supporting trays defining mutually exclusive spaces within the cooking chamber between trays to which steam is supplied exclusively from the opposite ends through said apertures such that food supported by a tray is subjected to cooking independently of the food in an adjacent tray, heating elements supported in the steam-generating chamber and a float control valve connected to the steam-generating chamber for maintaining a body of water in the steam-generating chamber.

2. A cooker according to claim 1 wherein there is an open vent in the heating chamber for maintaining the pressure in the cooker at an atmospheric pressure.

3. A cooker according to claim 1 wherein there is a drain at the bottom of the cooking chamber for returning condensate to the steam generating chamber.

4. A steam cooker according to claim 1 wherein there is an envelope of insulation completely enveloping the heating chamber and steam generating chamber.

5. A steam cooker according to claim 1 wherein there is circuitry including an ON and OFF switch for supplying power to the heating elements and a pre-heating switch operable in response to a temperature of 190° to shut off the power to the heating elements.

6. A steam cooker according to claim 1 wherein the circuitry includes a timer which can be set to override the pre-heating switch when the latter shuts off, to supply power to the heating elements for cooking.

7. A cooker according to claim 1 wherein there is an access door to the cooker and a switch operable by operation of the door to shut off the power to the heating elements.

* * * * *